(12) United States Patent
Sekine

(10) Patent No.: US 10,832,386 B2
(45) Date of Patent: Nov. 10, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hisato Sekine, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 40 days.

(21) Appl. No.: 16/113,268

(22) Filed: Aug. 27, 2018

(65) Prior Publication Data

US 2019/0073751 A1 Mar. 7, 2019

(30) Foreign Application Priority Data

Sep. 1, 2017 (JP) .................... 2017-168643

(51) Int. Cl.
| | | |
|---|---|---|
| *G06T 5/00* | (2006.01) | |
| *G06T 5/50* | (2006.01) | |
| *G06T 7/246* | (2017.01) | |
| *H04N 5/235* | (2006.01) | |
| *H04N 5/355* | (2011.01) | |

(52) U.S. Cl.
CPC .............. *G06T 5/003* (2013.01); *G06T 5/008* (2013.01); *G06T 5/50* (2013.01); *G06T 7/246* (2017.01); *G06T 7/248* (2017.01); *H04N 5/2355* (2013.01); *H04N 5/2356* (2013.01); *H04N 5/35581* (2013.01); *G06T 2207/10016* (2013.01); *G06T 2207/10024* (2013.01); *G06T 2207/10144* (2013.01); *G06T 2207/20201* (2013.01); *G06T 2207/20208* (2013.01); *G06T 2207/20221* (2013.01)

(58) Field of Classification Search
CPC ........... G06T 5/003; G06T 7/248; G06T 5/50; H04N 5/2355
USPC ................................. 382/167, 103, 195, 260
See application file for complete search history.

(56) References Cited

U.S. PATENT DOCUMENTS 8,760,537 B2 * 6/2014 Johnson .................... G06T 5/50
348/229.1
2012/0008005 A1 1/2012 Fukunishi
(Continued)

FOREIGN PATENT DOCUMENTS

JP 2012019337 A 1/2012
JP 2014220717 A 11/2014

*Primary Examiner* — Congvan Tran
(74) *Attorney, Agent, or Firm* — Rossi, Kimms & McDowell LLP

(57) ABSTRACT

The image processing apparatus according to one embodiment of the present invention has: an acquisition unit configured to acquire a first image captured with a first amount of exposure, a second image captured with a second amount of exposure different from the first amount of exposure before the first image is captured, and a third image captured with the second amount of exposure after the first image is captured; a specification unit configured to specify a direction of movement of an object by using at least two images of the first image, the second image, and the third image; and a composition unit configured to generate an HDR image by composing the first image with one of the second image and the third image for each pixel in accordance with the direction of movement of the object.

17 Claims, 15 Drawing Sheets

(56) References Cited

U.S. PATENT DOCUMENTS

| | | | |
|---|---|---|---|
| 2013/0136364 A1* | 5/2013 | Kobayashi | G06T 5/009 382/195 |
| 2013/0251283 A1* | 9/2013 | Atanassov | G06T 5/50 382/260 |
| 2015/0036878 A1* | 2/2015 | Nashizawa | G06T 5/50 382/103 |
| 2015/0092075 A1* | 4/2015 | Kim | H04N 5/23254 348/222.1 |
| 2016/0344954 A1* | 11/2016 | Kaizu | H04N 5/35554 |
| 2018/0324344 A1* | 11/2018 | Kinoshita | H04N 5/232 |
| 2019/0335079 A1* | 10/2019 | Koizumi | H04N 5/2351 |

\* cited by examiner

IMAGE PROCESSING APPARATUS, IMAGE PROCESSING METHOD, AND STORAGE MEDIUM

BACKGROUND OF THE INVENTION

Field of the Invention

The present invention relates to a technique to generate an HDR image by composing a plurality of images whose amounts of exposure are different.

Description of the Related Art

In general, a dynamic range of an image capturing sensor, such as a CCD and a CMOS, used in an image capturing apparatus, such as a digital camera and a digital video camera, is narrow compared to a dynamic range in the natural world. Because of this, in the case where a scene having a wide dynamic range (hereinafter, referred to as a high dynamic range and abbreviated to "HDR") is captured by a common method, blocked up shadows, blown out highlights, and so on occur. As a method of generating an image of a scene having the wide dynamic range such as this (hereinafter, referred to as an HDR scene), there is a method of generating an image of an HDR scene (hereinafter, referred to as an HDR image) by capturing a plurality of images whose amounts of exposure are different and composing them. In this method, first, a plurality of images is captured with different amounts of exposure. Hereinafter, an image whose amount of exposure is large is called a largely-exposed image and an image whose amount of exposure is small is called a slightly-exposed image. Next, for the plurality of captured images, digital gain correction (hereinafter, referred to as exposure amount correction) is performed based on the amount of exposure and the amount of exposure of each image is made equal. Lastly, from each piece of image data for which the exposure amount correction has been performed, an appropriate pixel is selected for each area of an image and an HDR image is generated by composing the pixels. Hereinafter, the composition method such as this is referred to as HDR composition.

However, in the case where an object moves during image capturing of such an HDR scene, there is a case where an HDR image cannot be composed appropriately. For example, in the case where an HDR scene 1500 including a moving object 1501 is captured and HDR composition is performed as shown in FIG. 15, a slightly-exposed image is composed in a saturation area (blown out highlights area) of a largely-exposed image. In the case such as this, by movement of the moving object 1501, a part of a composition-target area 1502 is hidden, and therefore, on a condition that an HDR image 1503 is generated by performing HDR composition, a multiple overlapping image 1504 or the like occurs. Hereinafter, an area that changes due to movement of an object at the time of composing a plurality of images is referred to as an occlusion area. For the problem such as this, Japanese Patent Laid-Open No. 2014-220717 has disclosed a method of making a multiple overlapping image less conspicuous by detecting an occlusion area and mixing a largely-exposed image and a slightly-exposed image for the occlusion area. Further, Japanese Patent Laid-Open No. 2012-19337 has disclosed a method of controlling a composition ratio of images in accordance with the size of a movement vector by calculating the movement vector between a plurality of images.

However, in an occlusion area, a disappearance area that disappears by movement of an object and an appearance area that appears by movement of an object exist. Hereinafter, the disappearance area and the appearance area are called occlusion characteristics. In the methods disclosed in Japanese Patent Laid-Open No. 2014-220717 and Japanese Patent Laid-Open No. 2012-19337 described above, the occlusion characteristics are not taken into consideration, and therefore, in a composed image, a multiple overlapping image, unnatural blur, an afterimage (tailing) of a moving object, and so on remain.

The present invention has been made in view of those problems and an object thereof is to generate an HDR image in which the occurrence of a multiple overlapping image, unnatural blur, tailing, and so on is suppressed by taking into consideration the occlusion characteristics of the occlusion area that occurs by a moving object.

SUMMARY OF THE INVENTION

The image processing apparatus according to one embodiment of the present invention has: an acquisition unit configured to acquire a first image captured with a first amount of exposure, a second image captured with a second amount of exposure different from the first amount of exposure before the first image is captured, and a third image captured with the second amount of exposure after the first image is captured; a specification unit configured to specify a direction of movement of an object by using at least two images of the first image, the second image, and the third image; and a composition unit configured to generate an HDR image by composing the first image with one of the second image and the third image for each pixel in accordance with the direction of movement of the object.

Further features of the present invention will become apparent from the following description of exemplary embodiments with reference to the attached drawings.

DESCRIPTION OF THE EMBODIMENTS

In the following, embodiments of the present invention are explained in detail with reference to the drawings. The embodiments of the present invention are not necessarily limited to the embodiments explained in the following. Further, all compositions of features in the following embodiments are not necessarily indispensable to the present invention. Explanation is given by attaching the same symbol to the same component.

First Embodiment

<Configuration of Image Capturing Apparatus>

Figure 1:
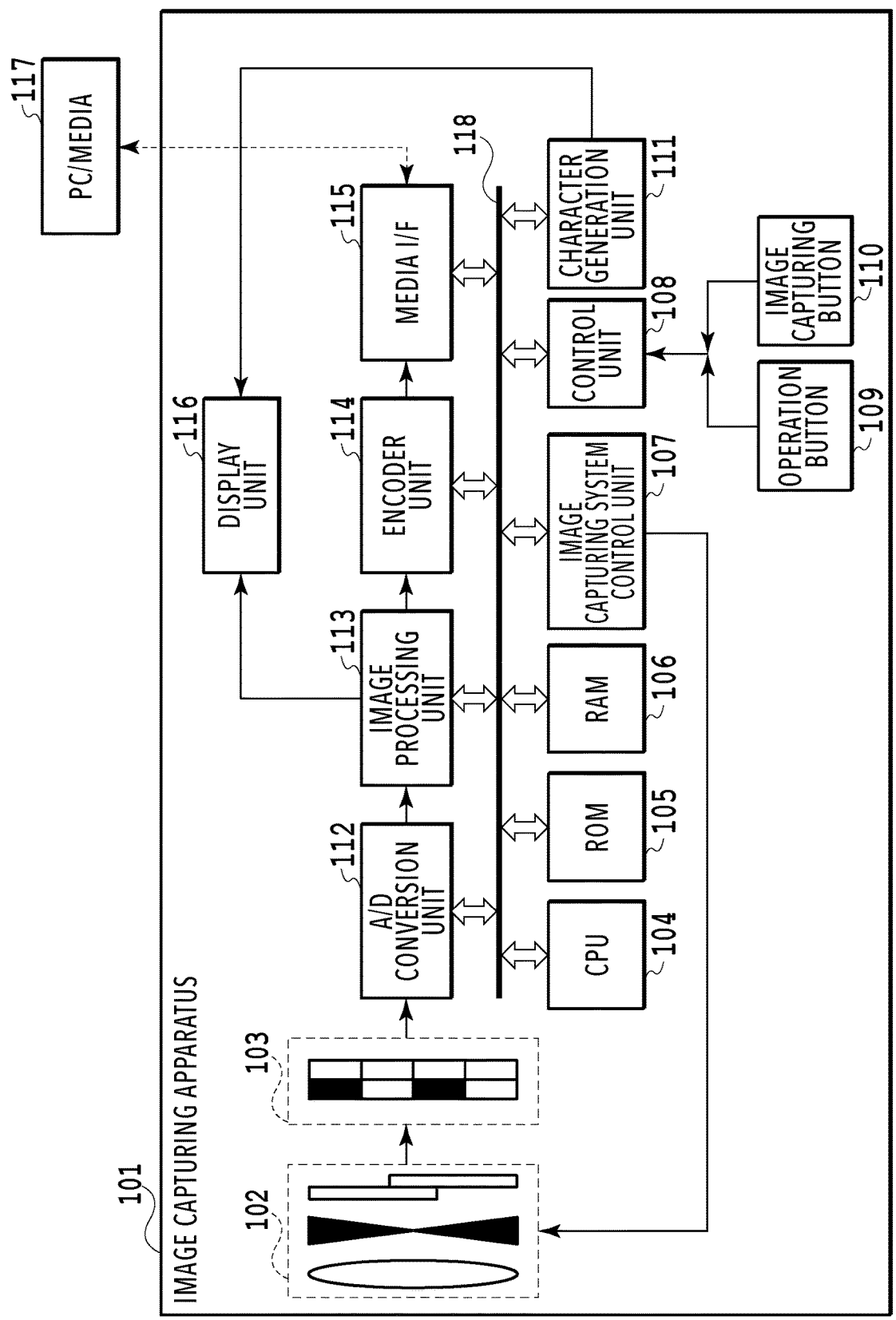
FIG. 1 is a block diagram showing a configuration of an image capturing apparatus of a first embodiment.

FIG. 1 is a block diagram showing a configuration of an image capturing apparatus 101 in the present embodiment. The image capturing apparatus 101 includes an optical unit 102, an image capturing element unit 103, a CPU 104, a ROM 105, a RAM 106, an image capturing system control unit 107, a control unit 108, an operation button 109, an image capturing button 110, and a character generation unit 111. Further, the image capturing apparatus 101 includes an A/D conversion unit 112, an image processing unit 113, an encoder unit 114, a media I/F 115, a display unit 116, and a system bus 118.

The optical unit 102 includes a zoom lens, a focus lens, a camera-shake correction lens, a diaphragm, and a shutter and collects light information on an object. The optical unit 102 only needs to be capable of collecting light information on an object, and the configuration thereof is not limited.

The image capturing element unit 103 is an element that converts light information collected by the optical unit 102 into a current value and outputs an analog signal. Further, the image capturing element unit 103 is capable of acquiring color information by using a color filter and the like. The optical unit 102 and the image capturing element unit 103 make up an image capturing component and function as an image capturing unit.

The CPU 104 controls processing of each component and sequentially reads and interprets commands stored in the ROM (Read Only Memory) 105 and the RAM (Random Access Memory) 106 and performs processing in accordance with the results.

The image capturing system control unit 107 performs control instructed by the CPU 104, such as focusing, opening a shutter, and adjusting a diaphragm, for the optical unit 102.

The control unit 108 performs control of the start and termination of the image capturing operation by the instructions of a user via the operation button 109 and the image capturing button 110.

The character generation unit 111 generates a character, a graphics, and so on and displays on the display unit 116.

The A/D conversion unit 112 converts the amount of light of an object into a digital signal value based on the analog signal output from the image capturing element unit 103.

The image processing unit 113 acquires image data converted into a digital signal and performs image processing. Further, the image processing unit 113 may display image data for which image processing has been performed on the display unit 116. It is possible for the image processing unit 113 to function as an image processing apparatus.

The encoder unit 114 converts image data processed in the image processing unit 113 into a file format, such as Jpeg.

The media I/F (interface) 115 is an interface for performing transmission and reception of image data with a PC/media 117 (for example, hard disk, memory card, CF card, SD card, and so on).

The system bus 118 is a bus for performing transmission and reception of data between components of the image capturing apparatus 101.

<Image Processing>

Figure 2:
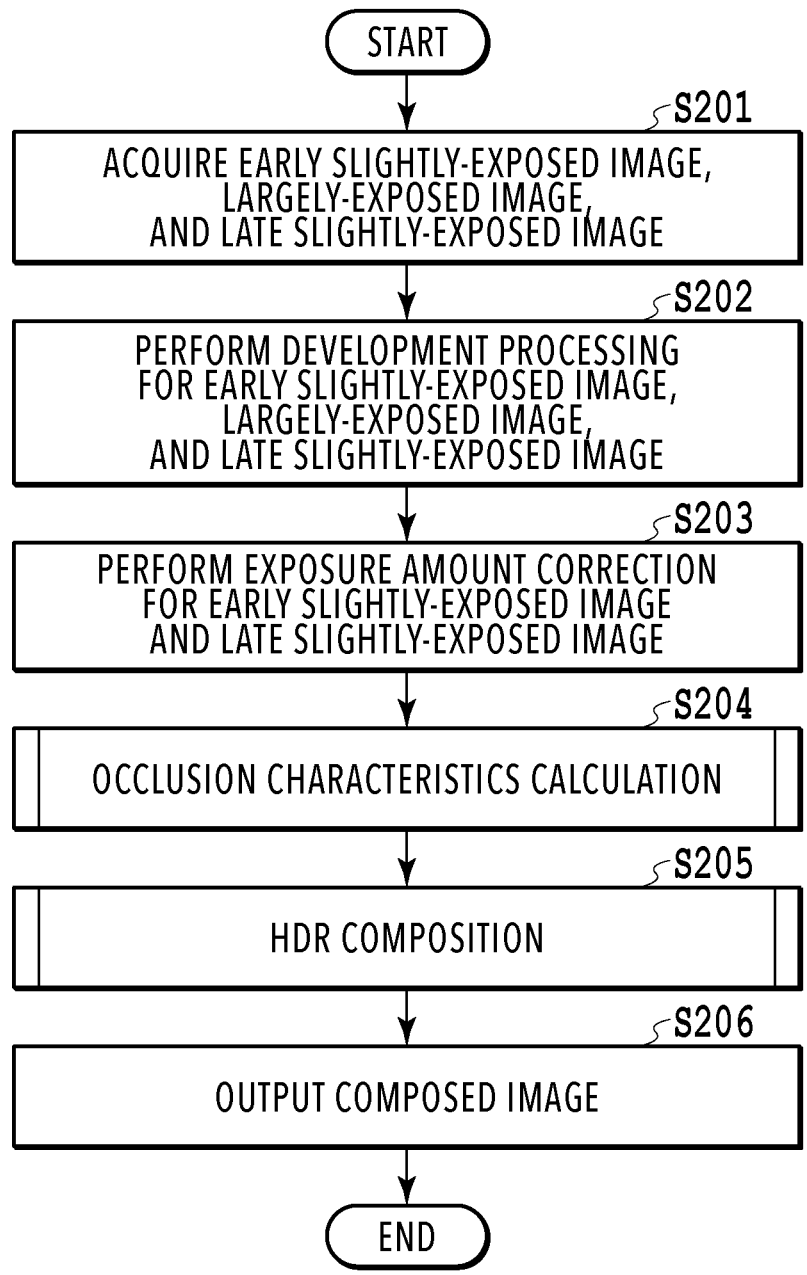
FIG. 2 is a diagram showing a flowchart of image processing of the first embodiment.

FIG. 2 shows a flowchart of image processing of the present embodiment.

Figure 3:
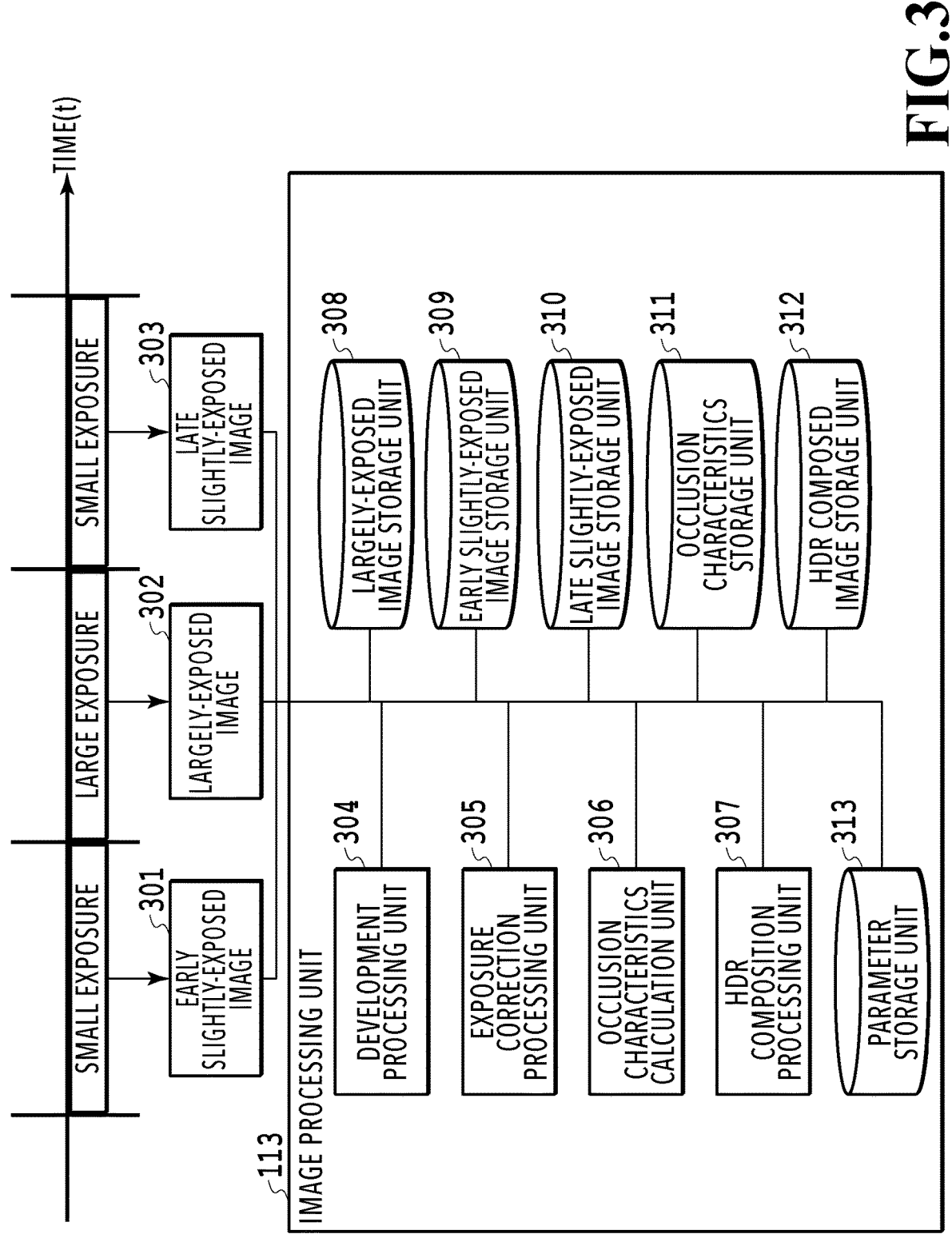
FIG. 3 is a block diagram showing a configuration of an image processing unit of the first embodiment.

Each step of the flowchart in FIG. 2 is performed by the image processing unit 113. Further, FIG. 3 is a block diagram showing the configuration of the image processing unit 113 of the present embodiment. The image processing unit 113 of the present embodiment includes a development processing unit 304, an exposure correction processing unit 305, an occlusion characteristics calculation unit 306, and an HDR composition processing unit 307. Further, the image processing unit 113 includes a largely-exposed image storage unit 308, an early slightly-exposed image storage unit 309, a late slightly-exposed image storage unit 310, an occlusion characteristics storage unit 311, an HDR composed image storage unit 312, and a parameter storage unit 313. In the following, by using FIG. 2 and FIG. 3, a general flow of the image processing of the present embodiment is explained in detail.

First, at step S201, the image processing unit 113 acquires an early slightly-exposed image 301, a largely-exposed image 302, and a late slightly-exposed image 303. The early slightly-exposed image 301, the largely-exposed image 302, and the late slightly-exposed image 303 are images obtained by capturing the same scene. The amount of exposure of the largely-exposed image 302 is referred to as a reference amount of exposure. The early slightly-exposed image 301 is an image captured with an amount of exposure smaller than the reference amount of exposure before the largely-exposed image 302 is captured. The late slightly-exposed image 303 is an image captured with an amount of exposure smaller than the reference amount of exposure after the largely-exposed image 302 is captured. That is, in the present embodiment, images obtained by continuously capturing a scene while switching alternately the reference amount of exposure and an amount of exposure smaller than the reference amount of exposure are taken to be the target of the processing.

At step S202, the development processing unit 304 performs development processing, such as white balance correction, demosaicking, and noise reduction, for the largely-exposed image 302, the early slightly-exposed image 301, and the late slightly-exposed image 303 acquired at step S202. The development processing unit 304 stores the largely-exposed image 302, the early slightly-exposed image 301, and the late slightly-exposed image 303 for which the development processing has been performed in the largely-exposed image storage unit 308, the early slightly-exposed image storage unit 309, and the late slightly-exposed image storage unit 310, respectively.

At step S203, the exposure correction processing unit 305 performs exposure correction processing for the early slightly-exposed image 301 and the late slightly-exposed image 303 stored at step S202 and stores in the early slightly-exposed image storage unit 309 and the late slightly-exposed image storage unit 310 respectively again. The exposure correction processing is processing to make the amount of exposure of the largely-exposed image at the same level as that of the amount of exposure of the slightly-exposed image by digital gain. For example, in the case where the amount of exposure of the largely-exposed image is taken to be $E_l$, the amount of exposure of the slightly-exposed image to be $E_s$, the slightly-exposed image before exposure correction processing to be S, and the slightly-exposed image after exposure correction processing to be S', it is possible to express the slightly-exposed image S' after exposure correction processing as expression (1) below.

$$S'=E_l/E_s*S \qquad (1)$$

At step S204, the occlusion characteristics calculation unit 306 calculates occlusion characteristics of an occlusion area by using the early slightly-exposed image 301 and the late slightly-exposed image 303 and stores the occlusion characteristics in the occlusion characteristics storage unit 311. In the case where there is movement of an object between a plurality of images captured continuously, an occlusion area hidden by an object occurs in each image. Further, in each image in the plurality of images, the position of the occlusion area is different in accordance with the direction of movement of an object. The occlusion characteristics indicate whether an area is the area that has been hidden by the object in the image captured earlier and which has appeared by movement of the object, or the area that disappears by movement of the object in the image captured later in a certain image. That is, the occlusion characteristics calculation unit 306 functions as a specification unit configured to specify the occlusion characteristics. It may also be possible for the occlusion characteristics calculation unit 306 to calculate the occlusion characteristics by using a parameter stored in advance in the parameter storage unit 313. Details of the occlusion characteristics calculation processing will be described later.

At step S205, the HDR composition processing unit 307 performs HDR composition processing by using the largely-exposed image 302, the early slightly-exposed image 301, the late slightly-exposed image 303, and the occlusion characteristics calculated at step S204 and generates an HDR image. The HDR composition processing unit 307 stores the generated HDR image in the HDR composed image storage unit 312. Details of the HDR composition processing will be described later.

Lastly, at step S206, the image processing unit 113 outputs the composed image (that is, the HDR image) stored in the HDR composed image storage unit 312 at step S205.

<Occlusion Characteristics Calculation Processing>

Figure 4:
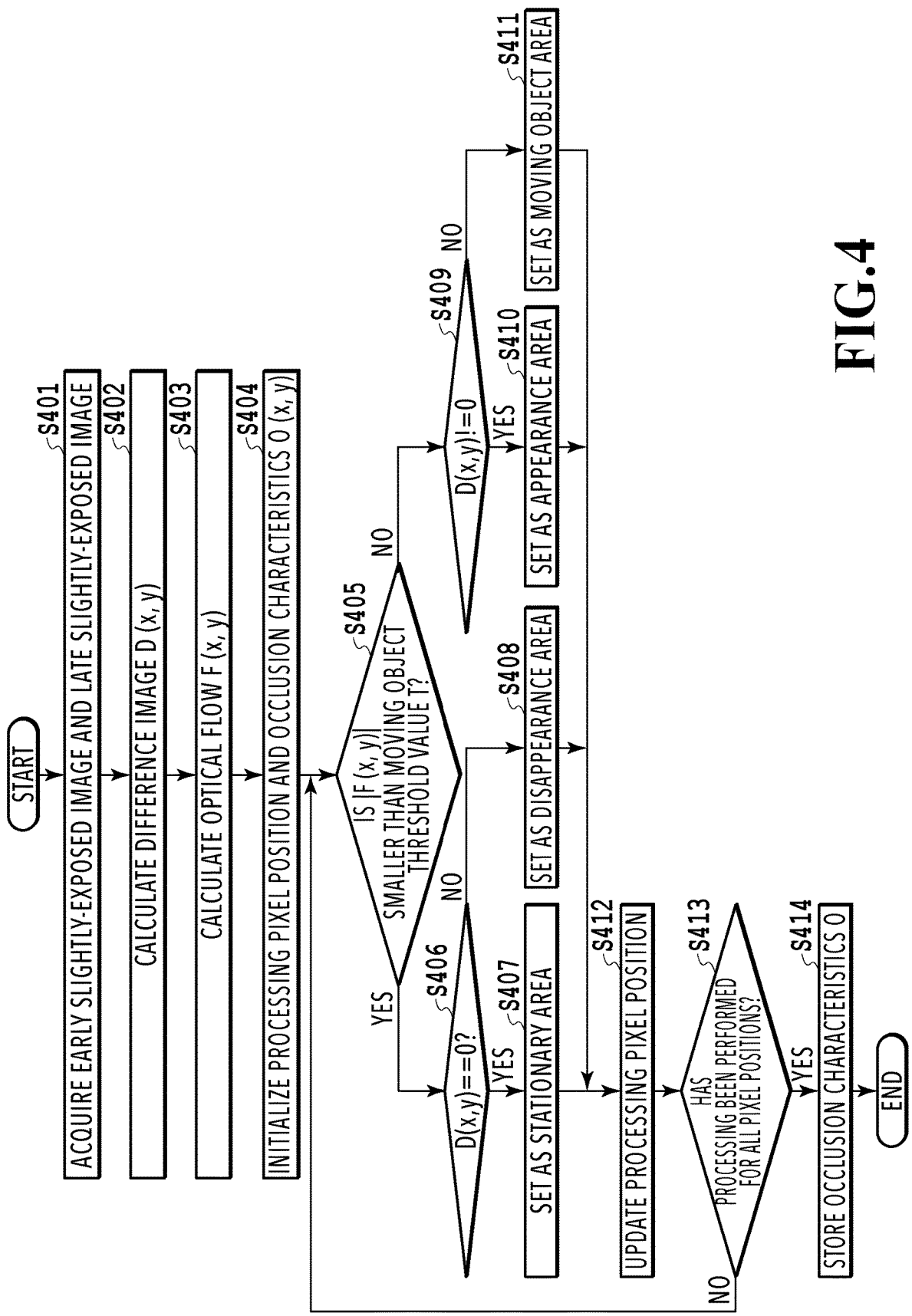
FIG. 4 is a diagram showing a flowchart of occlusion characteristics calculation processing of the first embodiment.
Figure 5:
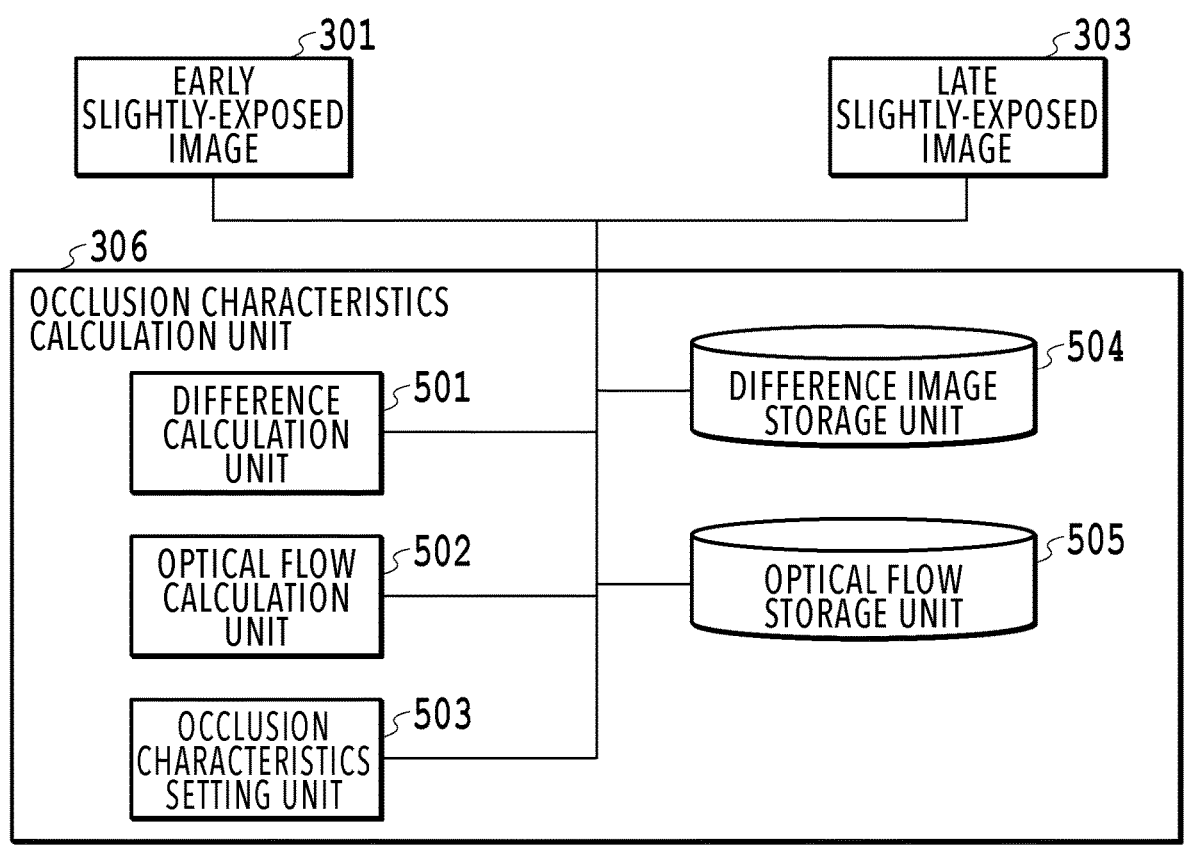
FIG. 5 is a block diagram showing a configuration of an occlusion characteristics calculation unit of the first embodiment.
Figure 6:
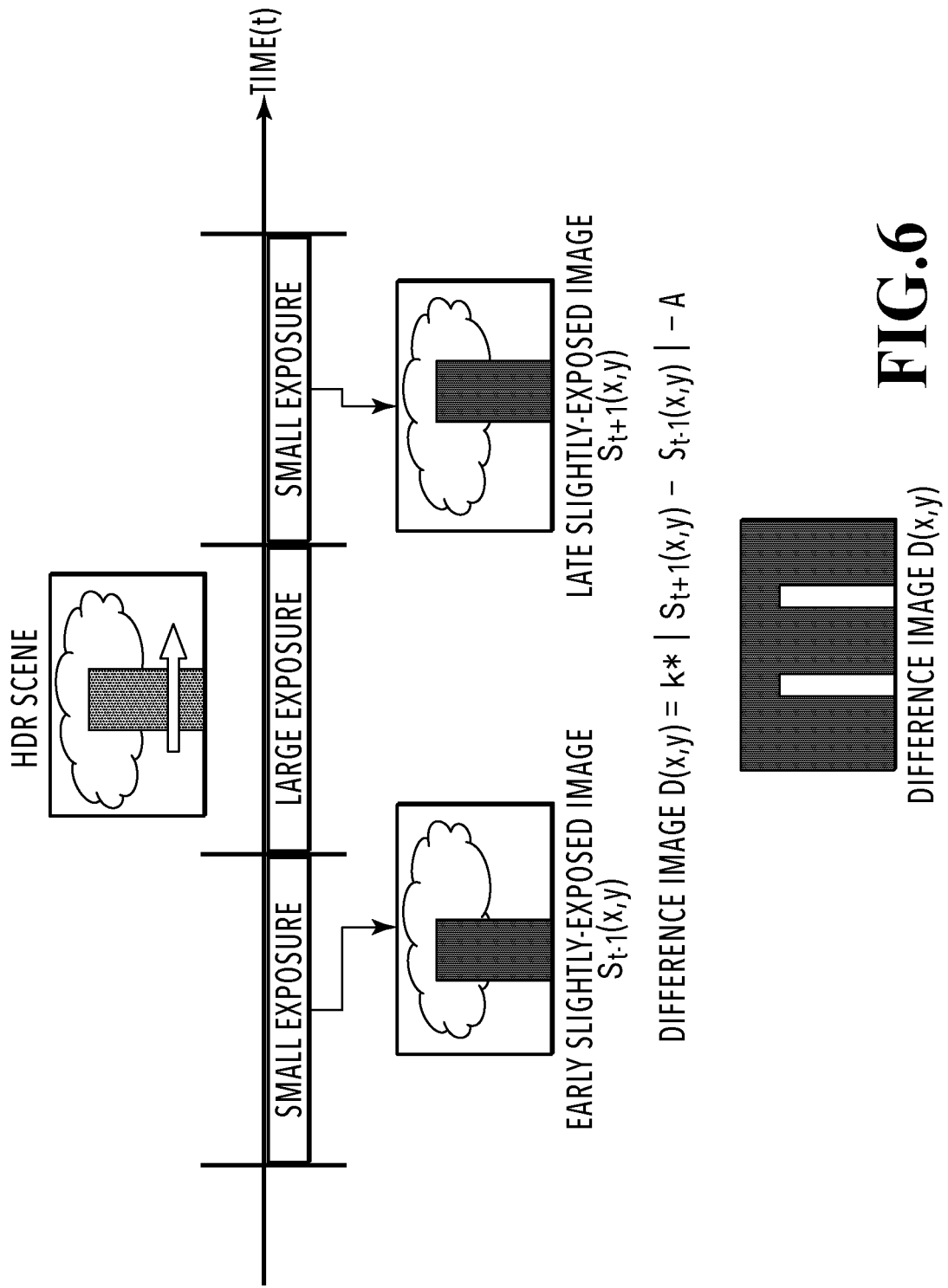
FIG. 6 is a diagram for explaining a difference image of the first embodiment.
Figure 7:
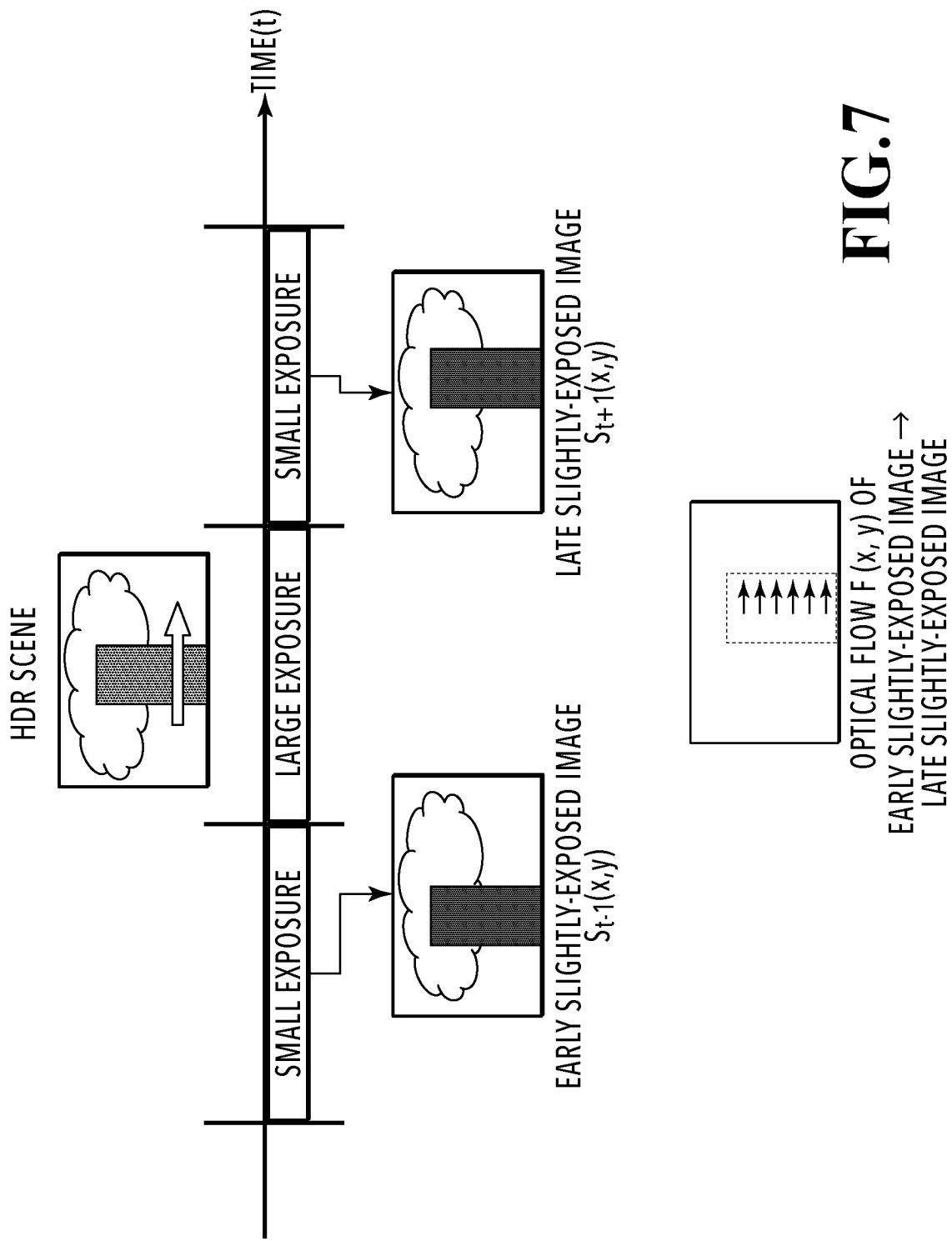
FIG. 7 is a diagram for explaining an optical flow of the first embodiment.
Figure 8:
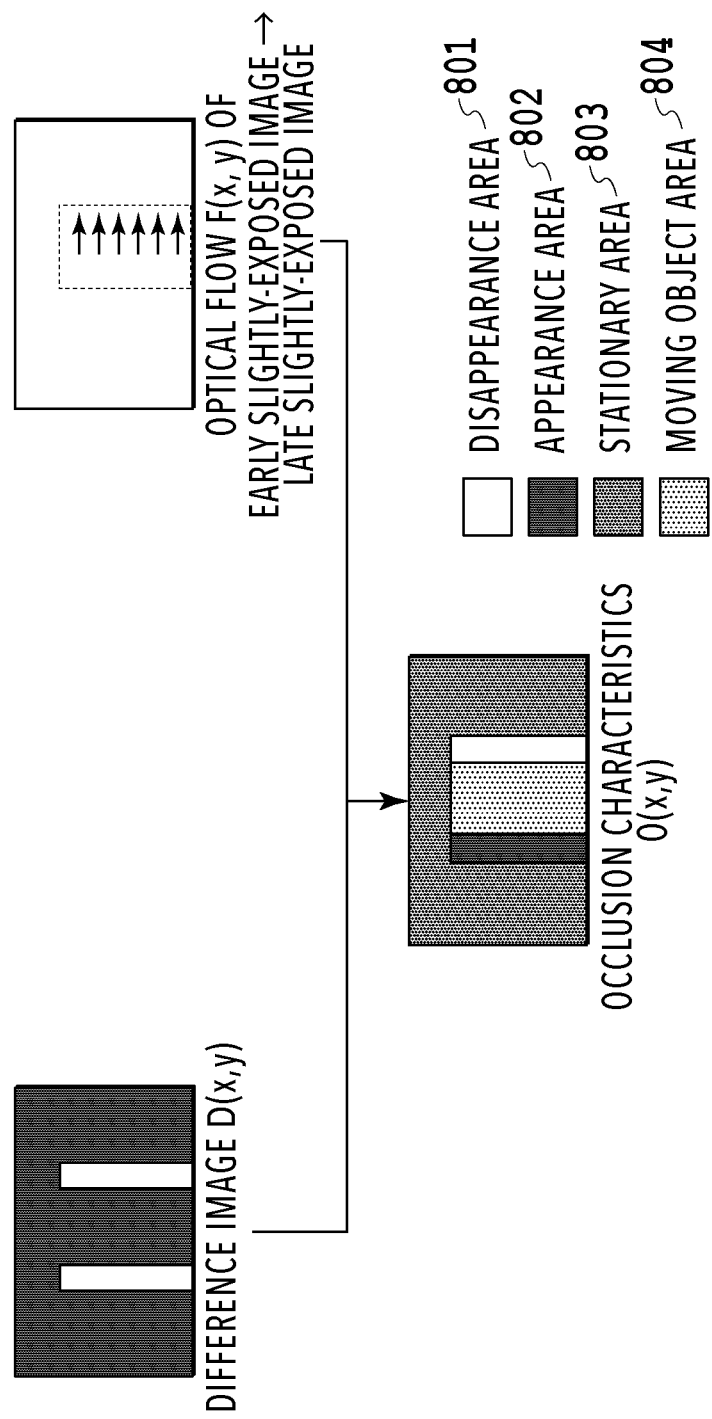
FIG. 8 is a diagram for explaining occlusion characteristics of the first embodiment.

FIG. 4 shows a flowchart of the occlusion characteristics calculation processing of the present embodiment. Each step of the flowchart in FIG. 4 is performed by the occlusion characteristics calculation unit 306. FIG. 5 is a block diagram showing a configuration of the occlusion characteristics calculation unit 306 of the present embodiment. The occlusion characteristics calculation unit 306 includes a difference calculation unit 501, an optical flow calculation unit 502, an occlusion characteristics setting unit 503, a difference image storage unit 504, and an optical flow storage unit 505. FIG. 6 is a diagram explaining a difference image of the present embodiment. FIG. 7 is a diagram explaining an optical flow of the present embodiment. FIG. 8 is a diagram explaining the occlusion characteristics of the present embodiment. In the following, by using FIG. 4 to FIG. 7, the occlusion characteristics calculation processing at step S204 described above is explained in detail.

First, at step S401, the occlusion characteristics calculation unit 306 acquires the early slightly-exposed image 301 stored in the early slightly-exposed image storage unit 309 and the late slightly-exposed image 303 stored in the late slightly-exposed image storage unit 310.

At step S402, the difference calculation unit 501 calculates a difference image between the early slightly-exposed image 301 and the late slightly-exposed image 303 and stores the difference image in the difference image storage unit 504. The difference calculation method in the difference calculation unit 501 may be any method as long as the method calculates a difference in pixel value of each pixel between the early slightly-exposed image 301 and the late slightly-exposed image 303. For example, as shown in FIG. 6, in the case where the early slightly-exposed image is taken to be $S_{t-1}$ (x, y) and the late slightly-exposed image to be $S_{t+1}$ (x, y), it is possible to calculate a difference image D (x, y) by using an absolute value difference as expressed in expression (2) below.

$$\left. \begin{array}{l} D(x, y) = k \cdot (|S_{t+1}(x, y) - S_{t-1}(x, y)| - A) \\ \text{if } (D(x, y) < 0) \\ \text{then } D(x, y) = 0 \end{array} \right\} \qquad (2)$$

Here, the pixel value of each pixel is represented by using a coordinate position (x, y) on an xy-plane. Time t is assumed to be time at which the largely-exposed image 302 is captured. Further, k is a coefficient for performing normalization and A is a coefficient for controlling a permitted value of the difference. By using the coefficient A, it is possible to regard the difference as being zero also in the case where the different between the early slightly-exposed image and the late slightly-exposed image is small. For example, the difference image D (x, y) becomes zero in "stationary area" and "moving object area", to be described later. The coefficient k and the coefficient A are stored in advance in the parameter storage unit 313. The calculation of a difference is not limited to the above-described method and it may also be possible to calculate a difference by using, for example, a method of a squared difference and the like.

At step S403, the optical flow calculation unit 502 calculates an optical flow indicating the direction of movement of an object at each pixel position by using the early slightly-exposed image 301 and the late slightly-exposed image 303 and stores the optical flow in the optical flow storage unit 505. The pixel value of a pixel in the optical flow is represented as F (x, y). The pixel value F (x, y) is a movement vector for each pixel as shown in FIG. 7. Hereinafter, the movement vector at one pixel is also simply called an optical flow. The calculation method of the optical flow F (x, y) may be any method as long as the method calculates a movement vector for each area between images. For example, it is possible to calculate the optical flow F (x, y) by using the Lucas-Kanade method. In the case where the occlusion characteristics are a disappearance area, the area that is the target of the calculation of the optical flow F (x, y) has disappeared, and therefore, the optical flow F (x, y) is not calculated. In the case where the optical flow F (x, y) cannot be calculated, in the present embodiment, the value of the optical flow F (x, y) is set to 0. Further, the set value in this case is not limited to 0 and it may also be possible to set a NULL value and the like.

At steps S404 to S413, the occlusion characteristics setting unit 503 calculates occlusion characteristics O (x, y) at each pixel position as shown in FIG. 8 and stores the occlusion characteristics O (x, y) in the occlusion characteristics storage unit 311. The occlusion characteristics O (x, y) are set to one of a disappearance area 801, an appearance area 802, a stationary area 803, and a moving object area 804.

At step S404, the occlusion characteristics setting unit 503 performs initialization of the pixel of interest position and the occlusion characteristics O (x, y).

At step S405, the occlusion characteristics setting unit 503 determines whether the size |F (x, y)| of the optical flow at the pixel of interest position (x, y) is smaller than a moving object threshold value T, which is a predetermined threshold value, stored in the parameter storage unit 313. In the case where the size is smaller than the moving object threshold value T, the processing advances to step S406 and in the other cases, the processing advances to step S409.

At step S406, the occlusion characteristics setting unit 503 determines whether the difference D (x, y) at the pixel of interest position (x, y) is zero. In the case where the difference D (x, y) is zero, the processing advances to step S407 and in the other cases, the processing advances to step S408.

At step S407, the occlusion characteristics setting unit 503 sets the occlusion characteristics O (x, y) as "stationary area" because the size of the optical flow at the pixel of interest position (x, y) is smaller than the moving object threshold value T and the difference D (x, y) is zero. That is, in the case where there is no movement between the early slightly-exposed image 301 and the late slightly-exposed image 303 and there is no difference in pixel value, it is possible to determine that the pixel of interest is located in "stationary area".

At step S408, the occlusion characteristics setting unit 503 sets the occlusion characteristics O (x, y) as "disappearance area" because the size of the optical flow at the pixel of interest position (x, y) is smaller than the moving object threshold value T and the difference D (x, y) is not zero. In "disappearance area" in which the optical flow cannot be calculated, the value of the optical flow is set to zero and is smaller than the moving object threshold value T. Further, there exists a difference in pixel value between the early slightly-exposed image 301 and the late slightly-exposed image 303. In such a case, it is possible to determine that the pixel of interest is located in "disappearance area" hidden by the movement of an object from the image capturing of the early slightly-exposed image until the image capturing of the late slightly-exposed image. The object that moves is also referred to as a moving object.

At step S409, the occlusion characteristics setting unit 503 determines whether the difference D (x, y) at the pixel of interest position (x, y) is zero. In the case where the difference D (x, y) is zero, the processing advances to step S410 and in the other cases, the processing advances to step S411.

At step S410, the occlusion characteristics setting unit 503 sets the occlusion characteristics O (x, y) as "appearance area" because the size of the optical flow at the pixel of interest position (x, y) is larger than the moving object threshold value T and the difference D (x, y) is not zero. That is, in the case where there is movement between the early slightly-exposed image 301 and the late slightly-exposed image 303 and there is a difference in pixel value, it is possible to determine that the area having been hidden by an object is "appearance area" having appeared by the movement of the object.

At step S411, the occlusion characteristics setting unit 503 sets the occlusion characteristics O (x, y) as "moving object area" because the size of the optical flow at the pixel of interest position (x, y) is larger than the moving object threshold value T and the difference D (x, y) is zero. That is, in the case where there is movement between the early slightly-exposed image 301 and the late slightly-exposed image 303 and there is no difference in pixel value, it is possible to determine that the area is "moving object area" of the object having moved, not "disappearance area" or "appearance area".

At step S412, the occlusion characteristics setting unit 503 updates the pixel of interest position and takes the next pixel position as a processing target.

At step S413, the occlusion characteristics setting unit 503 determines whether the processing has been performed for all the pixel positions. In the case where the processing has been performed for all the pixel positions, the processing advances to step S414 and in the other cases, the processing returns to step S405 and the processing at step S405 to step S413 is repeated.

Lastly, at step S414, the occlusion characteristics calculation unit 306 stores the set occlusion characteristics in the occlusion characteristics storage unit 311.

<HDR Composition Processing>

Figure 9:
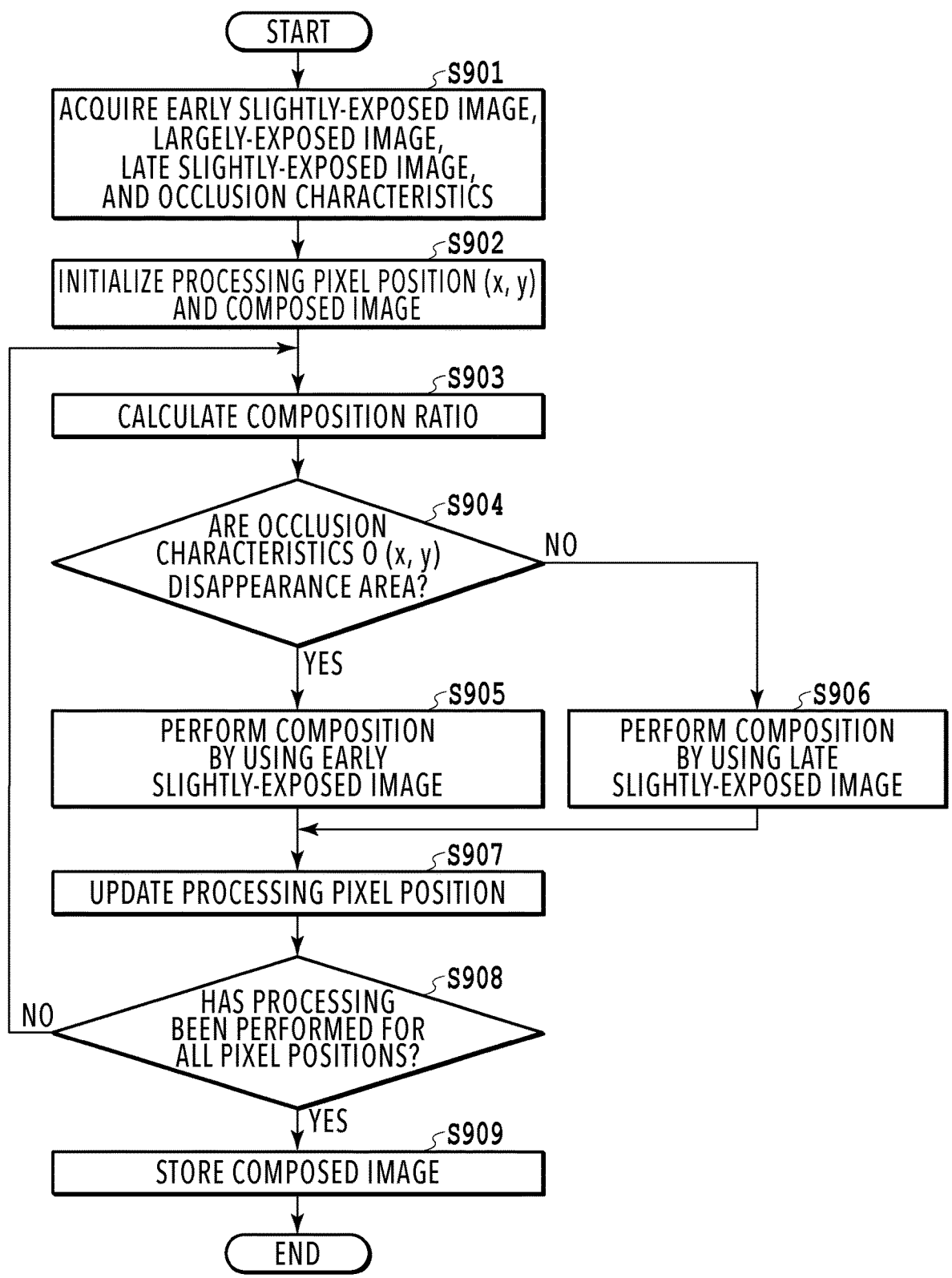
FIG. 9 is a diagram showing a flowchart of HDR composition processing of the first embodiment.

FIG. 9 shows a flowchart of the HDR composition processing of the present embodiment. Each step of the flowchart in FIG. 9 is performed by the HDR composition processing unit 307. In the following, by using FIG. 9, the HDR composition processing at step S205 described above is explained in detail.

First, at step S901, the HDR composition processing unit 307 acquires the largely-exposed image 302 stored in the largely-exposed image storage unit 308, the early slightly-exposed image 301 stored in the early slightly-exposed image storage unit 309, and the late slightly-exposed image 303 stored in the late slightly-exposed image storage unit 310. Further, the HDR composition processing unit 307 acquires the occlusion characteristics stored in the occlusion characteristics storage unit 311.

At step S902, the HDR composition processing unit 307 initializes the pixel of interest position (x, y) and a composed image that is output.

At step S903, the HDR composition processing unit 307 calculates a composition ratio of the largely-exposed image 302, the early slightly-exposed image 301, and the late slightly-exposed image 303.

Here, an example of the calculation method of a composition ratio is explained. First, in the case where the RGB values in an exposed image (x, y) are taken to be R, and B, a luminance value Y is calculated as expression (3) below.

$$Y = 0.2126 \times R + 0.7152 \times G + 0.0722 \times B \quad (3)$$

Next, in the case where the lower limit value of the composed luminance is taken to be $Th_1$ and the upper limit value to be $Th_2$, a composition ratio r is calculated as expression (4) below by using the calculated luminance value Y.

$$\left.\begin{array}{l} r = (Y - Th_1)/(Th_2 - Th_1) \\ \text{if } (r > 1) \\ \quad r = 1 \\ \text{else if } (r < 0) \\ \quad r = 0 \end{array}\right\} \quad (4)$$

The calculation method of a composition ratio is not limited to the above-described method. For example, it may also be possible to determine a composition ratio by using only G.

Next, at step S904, the HDR composition processing unit 307 determines whether the occlusion characteristics O (x, y) at a processing position (x, y) are "disappearance area". In the case where the occlusion characteristics O (x, y) are "disappearance area", the processing advances to step S905 and in the other cases, the processing advances to step S906.

At step S905, the HDR composition processing unit 307 composes a composed image C (x, y) as expression (5) blow by using a largely-exposed image L (x, y), the early slightly-exposed image $S_{t-1}$ (x, y), and the composition ratio r.

$$C(x,y)=(1-r)*L(x,y)+r*S_{t-1}(x,y) \quad (5)$$

As described above, in the case where the occlusion characteristics O (x, y) at the processing position (x, y) are "disappearance area", the composition processing is performed by using the early slightly-exposed image 301.

At step S906, the HDR composition processing unit 307 composes the composed image C (x, y) as expression (6) below by using the largely-exposed image L (x, y), the late slightly-exposed image $S_{t+1}$ (x, y), and the composition ratio r.

$$C(x,y)=(1-r)*L(x,y)+r*S_{t+1}(x,y) \quad (6)$$

As described above, in the case where the occlusion characteristics O (x, y) at the processing position (x, y) are not "disappearance area", the composition processing is performed by using the late slightly-exposed image 303.

In the HDR composition processing, as described above, only whether the occlusion characteristics O (x, y) are "disappearance area" is determined. Because of this, in the occlusion characteristics calculation processing described above, it may also be possible to determine only whether the occlusion characteristics O (x, y) at the processing position (x, y) are "disappearance area".

At step S907, the HDR composition processing unit 307 updates the pixel of interest position and takes the next pixel position as a processing target.

At step S908, the HDR composition processing unit 307 determines whether the processing has been performed for all the pixel positions. In the case where the processing has been performed for all the pixel positions, the processing advances to step S909 and in the other cases, the processing returns to step S903 and the processing at step S903 to step S908 is repeated.

Lastly, at step S909, the HDR composition processing unit 307 stores the composed HDR image in the HDR composed image storage unit 312.

As explained above, according to the present embodiment, by composing an early slightly-exposed image, a largely-exposed image, and a late slightly-exposed image in accordance with the occlusion characteristics based on the optical flow, it is made possible to compose an HDR image in which the occurrence of a multiple overlapping image, unnatural blur, tailing, and so on is suppressed.

In the present embodiment, the case is explained as an example where the processing is performed by using three images, that is an early slightly-exposed image, a largely-exposed image, and a late slightly-exposed image. However, the case is not limited to this. For example, it is possible to perform the same processing by taking a smaller amount of exposure to be the reference exposure and using three images captured in the order of an early largely-exposed image, a slightly-exposed image, and a late largely-exposed image.

Further, for specification of the occlusion characteristics, an early slightly-exposed image and a late slightly-exposed image are used. However, for specification of the occlusion characteristics, it is sufficient to use two images between which there is a difference in time. In the explanation described previously, two images of three images are used, but it may also be possible to specify the occlusion characteristics by adding a largely-exposed image with reference exposure and by using three images. For example, it is possible to specify the moving object area by comparing a value calculated from |L (t)−S (t−1)| and |S (t+1)−L(t)| with a moving object threshold value. Alternatively, in the case of three images captured in the order of an early large-exposed image, a slightly-exposed image, and a late largely-exposed image, the difference image D (x, y) is calculated based on $|L_{t+1}$ (x, y)$-L_{t-1}$ (x, y)|, not $|S_{t+1}$ (x, y)$-S_{t-1}$ (x,y)|.

Second Embodiment

In the first embodiment described above, the occlusion characteristics are calculated by using the optical flow of an early slightly-exposed image and a late slightly-exposed image. In the present embodiment, by a user inputting the characteristics of an image capturing scene, the occlusion characteristics are set without using an optical flow.

<Configuration of Image Capturing Apparatus>

The configuration of the image capturing apparatus 101 of the present embodiment is the same as that of the first embodiment described above, and therefore, explanation is omitted.

<Image Processing>

Figure 10:
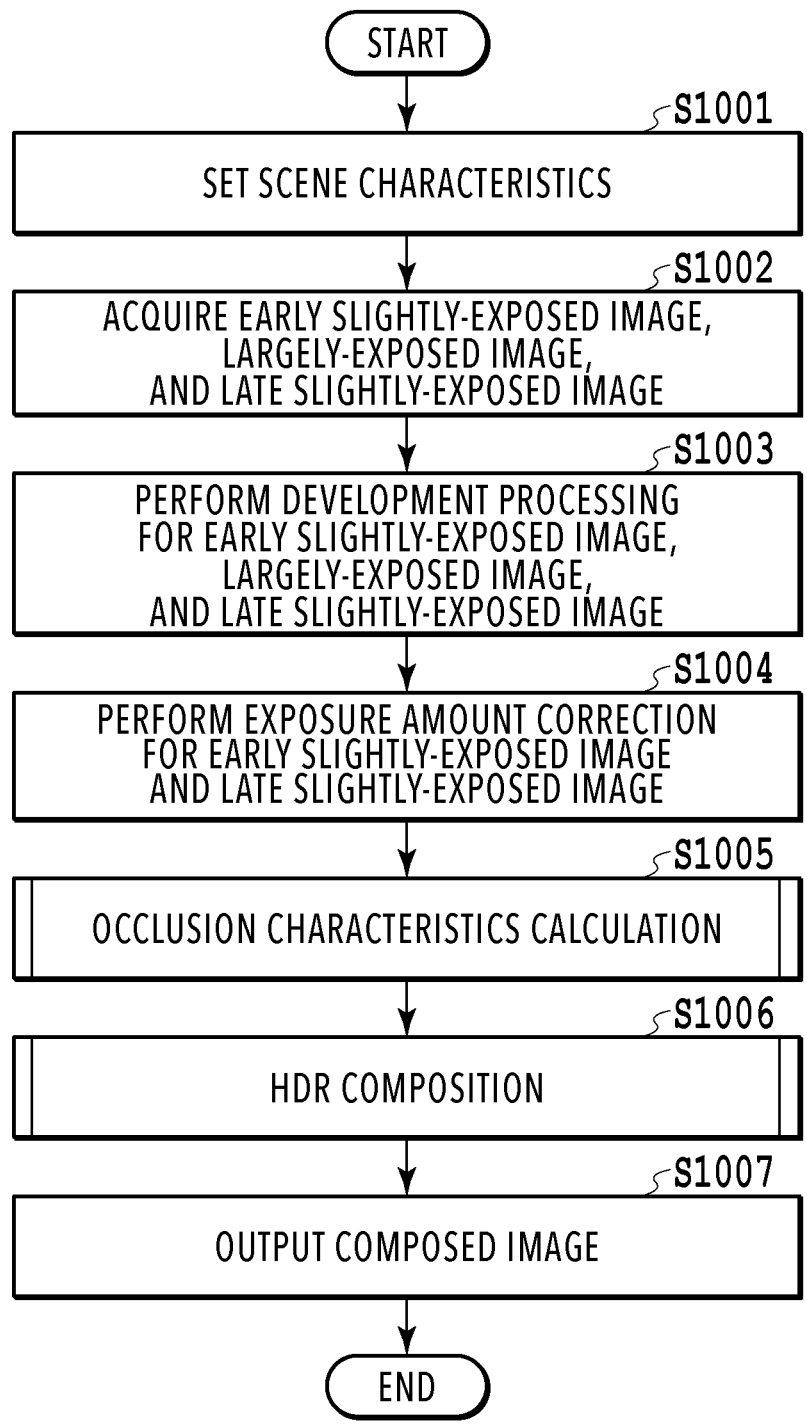
FIG. 10 is a diagram showing a flowchart of image processing of a second embodiment.
Figure 11:
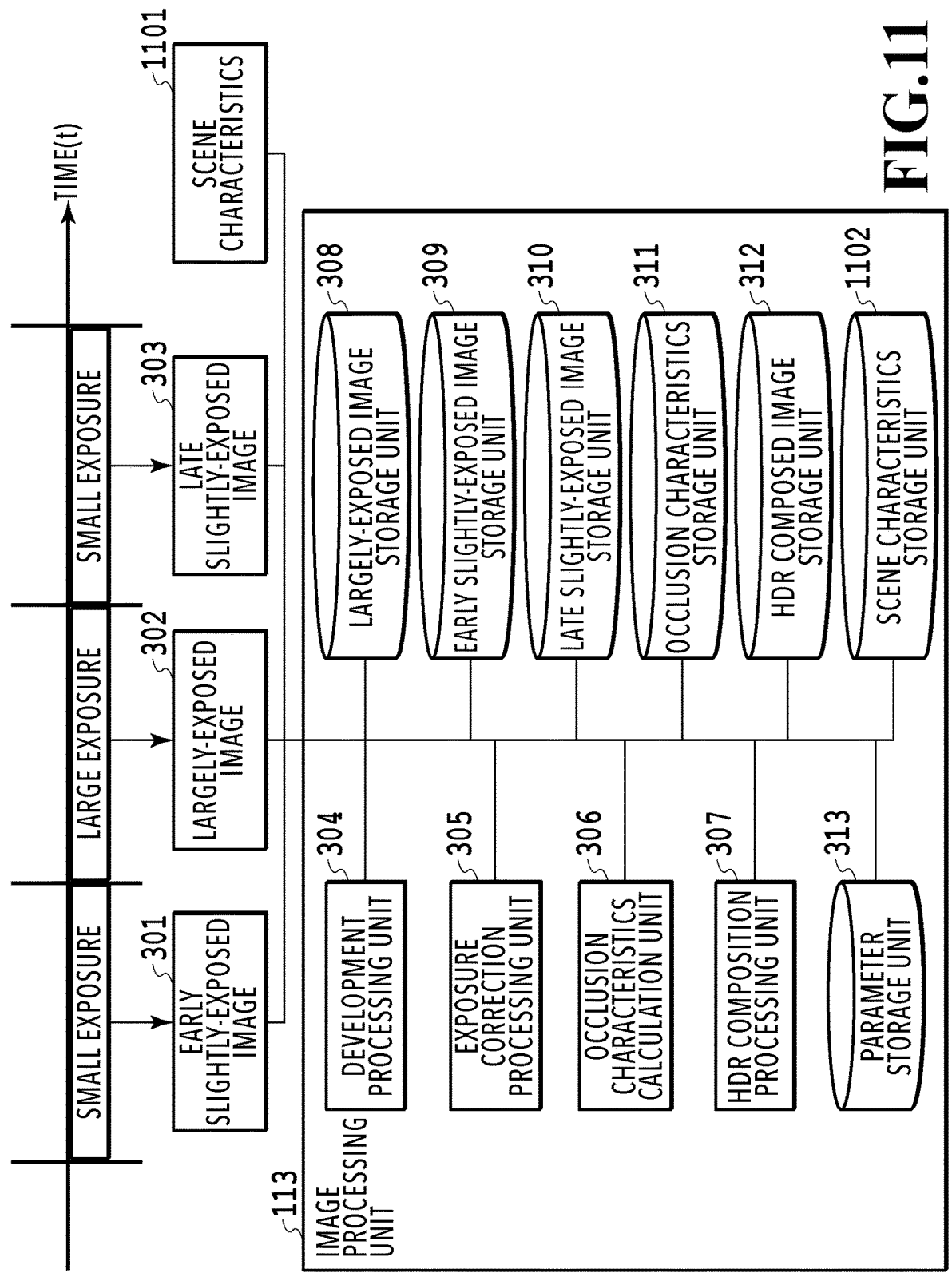
FIG. 11 is a block diagram showing a configuration of an image processing unit of the second embodiment.

FIG. 10 shows a flowchart of image processing of the present embodiment. Each step of the flowchart in FIG. 10 is performed by the image processing unit 113. Further, FIG. 11 is a block diagram showing the configuration of the image processing unit 113 of the present embodiment. Compared to the image processing unit of the first embodiment described above, the image processing unit 113 of the present embodiment further includes a scene characteristics storage unit 1102 configured to store scene characteristics 1101 that are input by a user. Further, the configuration of the occlusion characteristics calculation unit 306 of the present embodiment is different from that of the first embodiment, and therefore, details will be described later. In the following, by using FIG. 10 and FIG. 11, a general flow of the image processing of the present embodiment is explained in detail.

Figure 14:
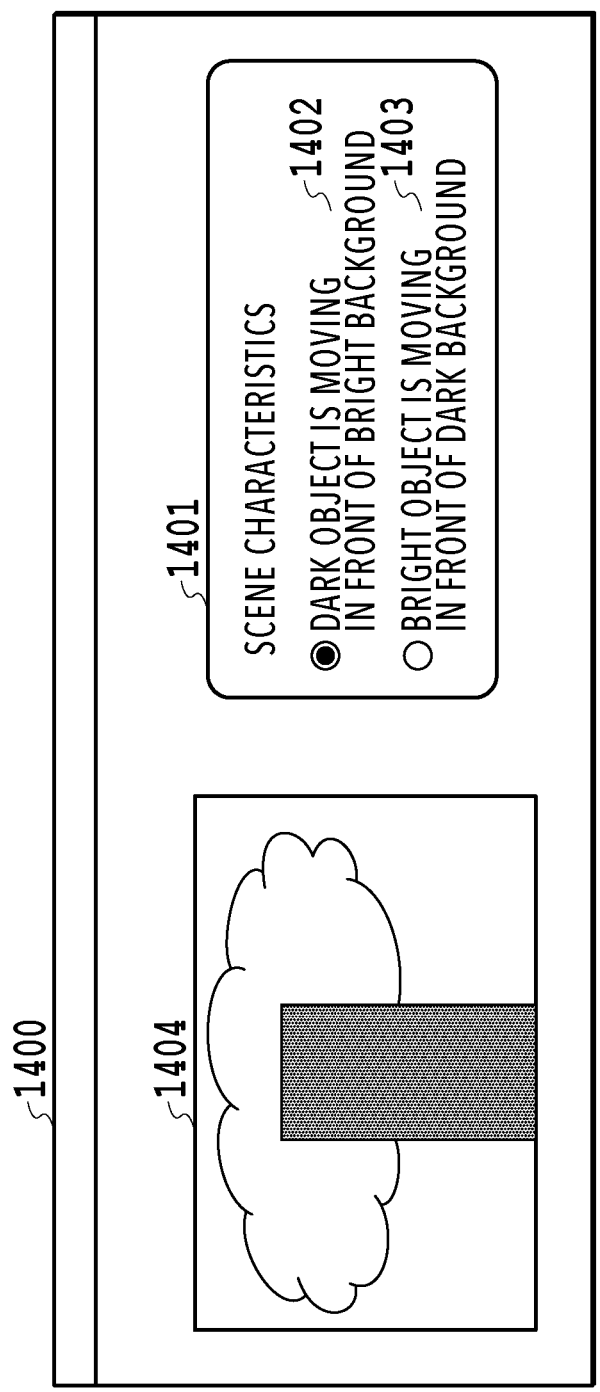
FIG. 14 is a diagram showing an example of a user interface of the second embodiment.
Figure 15:
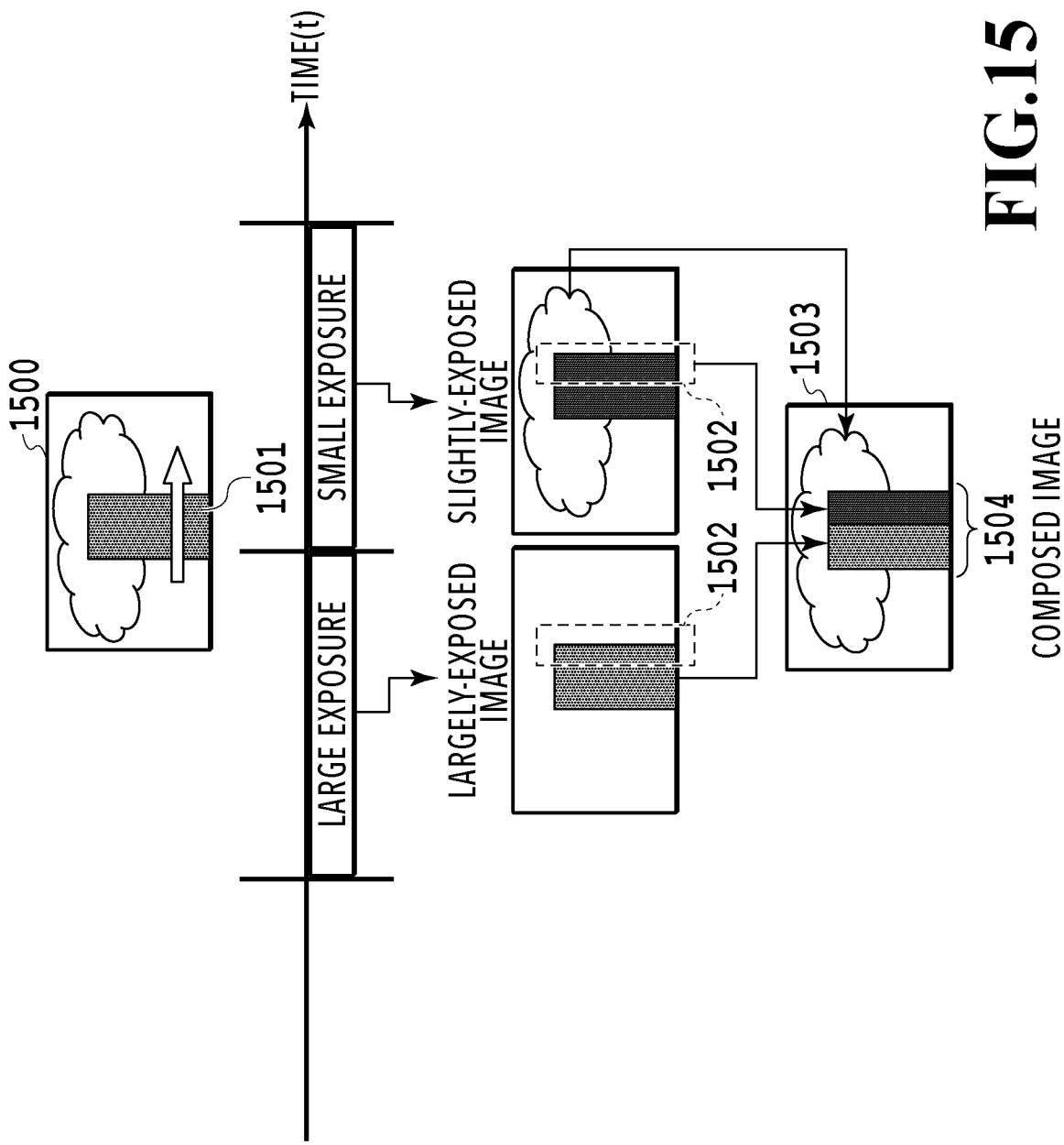
FIG. 15 is a diagram for explaining conventional HDR composition processing.

First, at step S1001, the image processing unit 113 sets the scene characteristics 1101 that are input by a user and stores the scene characteristics 1101 in the scene characteristics storage unit 1102. FIG. 14 shows an example of a user interface of the present embodiment. A user interface 1400 is a user interface for a user to input the scene characteristics and has a scene characteristics specification unit 1401. In the scene characteristics specification unit 1401, a user selects whether an image capturing scene 1404 is a scene 1402 in which a dark object is moving in front of a bright background or a scene 1403 in which a bright object is moving in front of a dark background. In the example shown in FIG. 14, the scene 1402 in which a dark object is moving in front of a bright background is specified.

The processing at step S1002 to step S1004, step S1006, and step S1007 is the same as that of the first embodiment, and therefore, explanation is omitted. The processing contents of occlusion characteristics calculation processing at step S1005 are different from those of the first embodiment, and therefore, detailed explanation is given in the following.

<Occlusion Characteristics Calculation Processing>

Figure 12:
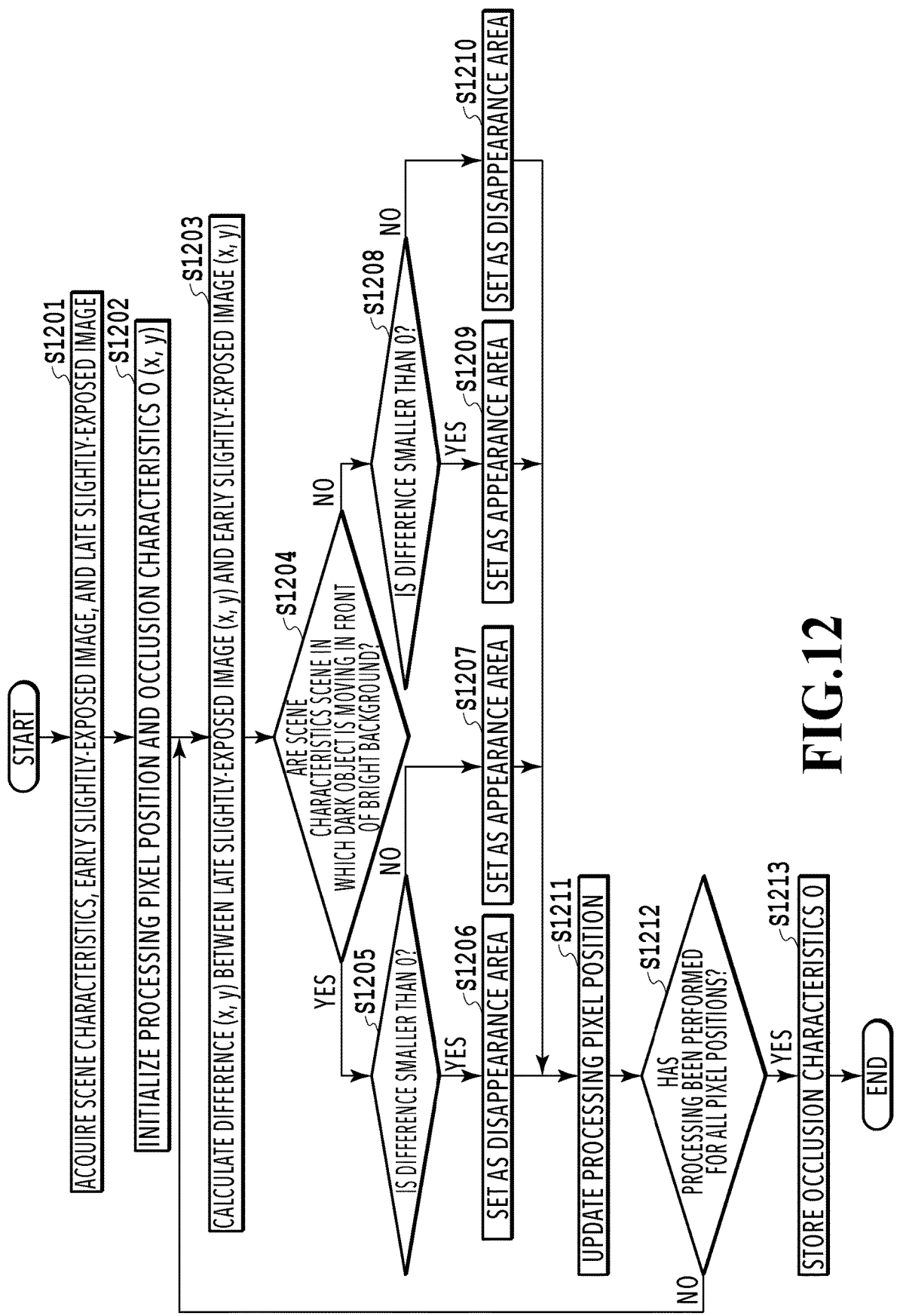
FIG. 12 is a diagram showing a flowchart of occlusion characteristics calculation processing of the second embodiment.
Figure 13:
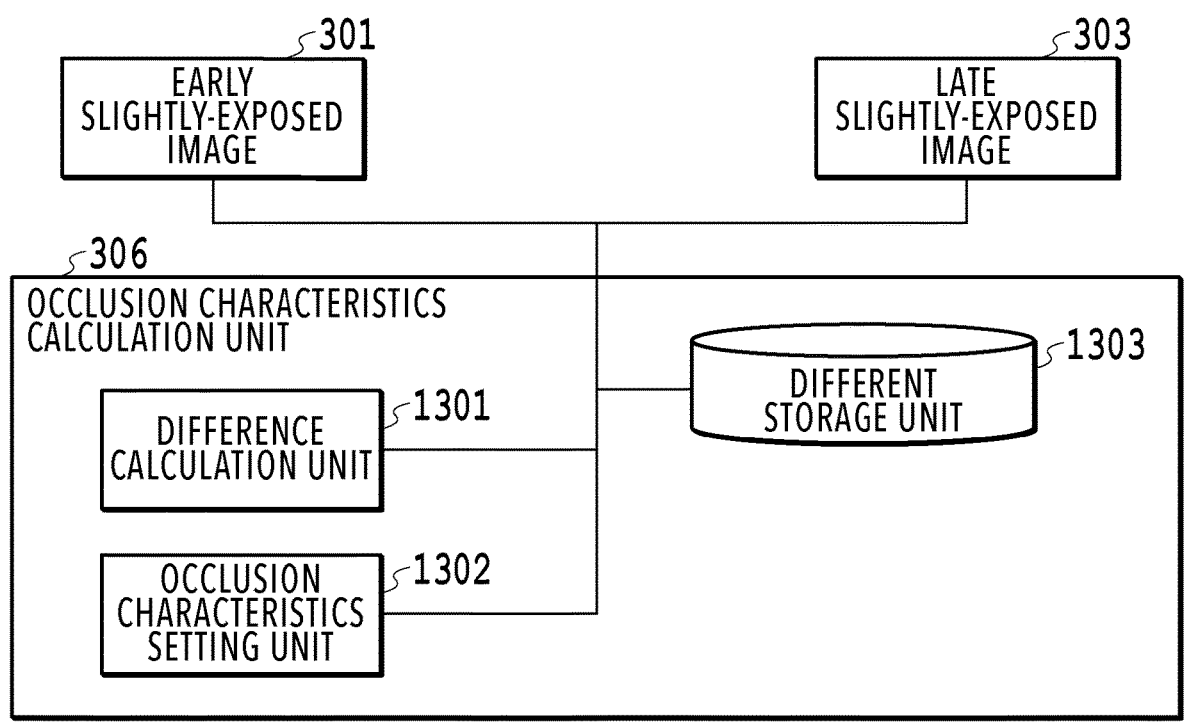
FIG. 13 is a block diagram showing a configuration of an occlusion characteristics calculation unit of the second embodiment.

FIG. 12 shows a flowchart of the occlusion characteristics calculation processing of the present embodiment. Each step of the flowchart in FIG. 12 is performed by the occlusion characteristics calculation unit 306. FIG. 13 is a block diagram showing the configuration of the occlusion characteristics calculation unit 306 of the present embodiment. The occlusion characteristics calculation unit 306 of the present embodiment includes a difference calculation unit 1301, an occlusion characteristics setting unit 1302, and a difference storage unit 1303.

First, at step S1201, the occlusion characteristics calculation unit 306 acquires the early slightly-exposed image 301 stored in the early slightly-exposed image storage unit 309 and the late slightly-exposed image 303 stored in the late slightly-exposed image storage unit 310. Further, in the present embodiment, the scene characteristics 1101 stored in the scene characteristics storage unit 1102 are acquired.

At step S1202, the occlusion characteristics calculation unit 306 initializes the pixel of interest position and the occlusion characteristics O (x, y).

At step S1203, the difference calculation unit 1301 calculates a difference between the late slightly-exposed image 303 and the early slightly-exposed image 301 at the pixel of interest position (x, y) and stores the difference in the difference storage unit 1303. The difference D (x, y) in the present embodiment is calculated as shown in expression (7) below in the case where the early slightly-exposed image is taken to be $S_{t-1}$ (x, y) and the late slightly-exposed image to be $S_{t+1}$ (x, y).

$$D(x,y)=S_{t+1}(x,y)-S_{t-1}(x,y) \quad (7)$$

As described above, the difference D (x, y) in the present embodiment also includes information indicating positive/negative of the difference in pixel value, different from the first embodiment.

At step S1204, the occlusion characteristics setting unit 1302 determines whether the scene characteristics 1101 acquired at step S1201 are the "scene 1402 in which a dark object is moving in front of a bright background". In the case of the "scene 1402 in which a dark object is moving in front of a bright background", the processing advances to step S1205 and in the other cases, the processing advances to step S1208.

At step S1205, the occlusion characteristics setting unit 1302 determines whether the difference D (x, y) calculated at step S1203 is negative. In the case where the difference D (x, y) is negative, the processing advances to step S1206 and in the other cases, the processing advances to step S1207.

At step S1206, the occlusion characteristics setting unit 1302 sets the occlusion characteristics O (x, y) at the pixel of interest position (x, y) as "disappearance area".

At step S1207, the occlusion characteristics setting unit 1302 sets the occlusion characteristics O (x, y) at the pixel of interest position (x, y) as "appearance area".

At step S1208, the occlusion characteristics setting unit 1302 determines whether the difference D (x, y) calculated at step S1203 is negative. In the case where the difference D (x, y) is negative, the processing advances to step S1209 and in the other cases, the processing advances to step S1210.

At step S1209, the occlusion characteristics setting unit 1302 sets the occlusion characteristics O (x, y) at the pixel of interest position (x, y) as "appearance area".

At step S1210, the occlusion characteristics setting unit 1302 sets the occlusion characteristics O (x, y) at the pixel of interest position (x, y) as "disappearance area".

At step S1211, the occlusion characteristics setting unit 1302 updates the pixel of interest position and takes the next pixel position as a processing target.

At step S1212, the occlusion characteristics setting unit 1302 determines whether the processing has been performed for all the pixel positions. In the case where the processing has been performed for all the pixel positions, the processing advances to step S1213 and in the other cases, the processing returns to step S1203 and the processing at step S1203 to step S1212 is repeated.

At step S1213, the occlusion characteristics calculation unit 306 stores the set occlusion characteristics in the occlusion characteristics storage unit 311.

In the present embodiment also, it may also be possible to determine only whether the occlusion characteristics O (x, y) at the processing position (x, y) are "disappearance area".

As explained above, in the present embodiment, the scene characteristics of an image capturing scene are set, and therefore, it is possible to set the occlusion characteristics by determining whether the difference is positive or negative in accordance with the scene characteristics. That is, in the present embodiment, it is made possible to compose an HDR image in which the occurrence of a multiple overlapping image, unnatural blur, tailing, and so on is suppressed in accordance with the occlusion characteristics without the need to calculate an optical flow, which is required in the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to generate an HDR image in which the occurrence of a multiple overlapping image, unnatural blur, tailing, and so on is suppressed by taking into consideration the occlusion characteristics of an occlusion area that is generated by a moving object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-168643 filed Sep. 1, 2017, which is hereby incorporated by reference wherein in its entirety.

What is claimed is:

1. An image processing apparatus comprising:
an acquisition unit configured to acquire a first image captured with a first amount of exposure, a second image captured with a second amount of exposure different from the first amount of exposure before the first image is captured, and a third image captured with the second amount of exposure after the first image is captured;
a specification unit configured to specify a occlusion characteristics of an object by using at least two images of the first image, the second image, and the third image; and
a composition unit configured to generate an HDR image by composing the first image with at least one pixel of the second image or the third image in accordance with the occlusion characteristics of the object,
wherein the composition unit composes:
at least one pixel in the third image in a case where a pixel of interest is a pixel in a neighboring area of the object in the first image and a pixel in an appearance area, which is an area having been hidden by the object and having appeared by movement of the object in the second image; and
at least one pixel in the second image in a case where the pixel of interest is a pixel in a disappearance area whose background area has disappeared in the second image by movement of the object.

2. The image processing apparatus according to claim 1, wherein
the composition unit composes a pixel value of the pixel of interest in the third image for a pixel value of the pixel of interest in the first image in a case where the pixel of interest is not a pixel in the disappearance area.

3. The image processing apparatus according to claim 1, wherein
the specification unit specifies the occlusion characteristics by using a difference image calculated from a difference between the second image and the third image and an optical flow.

4. The image processing apparatus according to claim 3, wherein
the specification unit specifies the occlusion characteristics of the pixel of interest as the disappearance area in a case where the size of a movement vector corresponding to the pixel of interest in the optical flow is smaller than a predetermined threshold value and a pixel value corresponding to the pixel of interest in the difference image is not zero.

5. The image processing apparatus according to claim 3, wherein
the specification unit specifies the occlusion characteristics of the pixel of interest as the appearance area in a case where the size of a movement vector corresponding to the pixel of interest in the optical flow is larger than a predetermined threshold value and a pixel value corresponding to the pixel of interest in the difference image is not zero.

6. The image processing apparatus according to claim 3, wherein
the specification unit specifies the occlusion characteristics of the pixel of interest as an area of the object in a case where the size of a movement vector corresponding to the pixel of interest in the optical flow is larger than a predetermined threshold value and a pixel value corresponding to the pixel of interest in the difference image is zero.

7. The image processing apparatus according to claim 1, wherein
each of the first image, the second image, and the third image is a color image including RGB and a composition ratio used by the composition unit is calculated based on a luminance value calculated from pixel values corresponding to R, G, and B of the pixel of interest in one of the first image, the second image, and the third image.

8. The image processing apparatus according to claim 1, wherein
the specification unit specifies the occlusion characteristics by using scene characteristics of a scene specified by a user and a difference in pixel value calculated from the second image and the third image.

9. The image processing apparatus according to claim 8, wherein
the specification unit acquires information indicating positive/negative of the difference.

10. The image processing apparatus according to claim 8, wherein
the scene characteristics are brightness of the object for a background of the scene.

11. The image processing apparatus according to claim 9, wherein
the specification unit specifies the occlusion characteristics of an area whose difference is negative as the disappearance area in a case where the object is dark for the background and specifies the occlusion characteristics of an area whose difference is positive as the disappearance area in a case where the object is bright for the background.

12. An image processing method, the method comprising the steps of:
acquiring a first image captured with a first amount of exposure, a second image captured with a second amount of exposure different from the first amount of exposure before the first image is captured, and a third image captured with the second amount of exposure after the first image is captured;
specifying a occlusion characteristics of an object by using at least two images of the first image, the second image, and the third image; and
generating an HDR image by composing the first image with at least one pixel of the second image or the third image in accordance with the occlusion characteristics of the object,
wherein
the generating an HDR image includes:
composing at least one pixel in the third image in a case where a pixel of interest is a pixel in a neighboring area of the object in the first image and a pixel in an appearance area, which is an area having been hidden by the object by movement of the object and having appeared in the second image; and composing at least one pixel in the second image in a case where the pixel of interest is a pixel in a disappearance area whose background area has disappeared in the second image by movement of the object.

13. The image processing method according to claim 12, wherein
the step of specifying the occlusion characteristics includes specifying the occlusion characteristics by using a difference image calculated from a difference between the second image and the third image and an optical flow.

14. The image processing method according to claim 12, wherein
the step of specifying the occlusion characteristics includes specifying the occlusion characteristics by using scene characteristics of a scene specified by a user and a difference in pixel value calculated from the second image and the third image.

15. A non-transitory computer readable storage medium storing a program for causing a computer to perform an image processing method, the method comprising the steps of:
acquiring a first image captured with a first amount of exposure, a second image captured with a second amount of exposure different from the first amount of exposure before the first image is captured, and a third image captured with the second amount of exposure after the first image is captured;
specifying a occlusion characteristics of an object by using at least two images of the first image, the second image, and the third image; and
generating an HDR image by composing the first image with at least one pixel of the second image or the third image in accordance with the occlusion characteristics of the object,
wherein
the generating an HDR image includes:
composing at least one pixel in the third image in a case where a pixel of interest is a pixel in a neighboring area of the object in the first image and a pixel in an appearance area, which is an area having been hidden by the object by movement of the object and having appeared in the second image; and
composing at least one pixel in the second image in a case where the pixel of interest is a pixel in a disappearance area whose background area has disappeared in the second image by movement of the object.

16. The non-transitory computer readable storage medium according to claim 15, wherein
the step of specifying the occlusion characteristics includes specifying the occlusion characteristics by using a difference image calculated from a difference between the second image and the third image and an optical flow.

17. The non-transitory computer readable storage medium according to claim 15, wherein
the step of specifying the occlusion characteristics includes specifying the occlusion characteristics by using scene characteristics of a scene specified by a user and a difference in pixel value calculated from the second image and the third image.

* * * * *